United States Patent

[11] 3,571,640

| [72] | Inventor | John A. Watt |
| | | Ann Arbor, Mich. |
| [21] | Appl. No. | 819,195 |
| [22] | Filed | Apr. 25, 1969 |
| [45] | Patented | Mar. 23, 1971 |
| [73] | Assignee | Kelsey-Hayes Company |
| | | Romulus, Mich. |

[54] FLUX REVERSING SENSOR
5 Claims, 3 Drawing Figs.

[52] U.S. Cl. .................................................. 310/168
[51] Int. Cl. .................................................. H02k 17/42
[50] Field of Search .................................. 310/171,
172, 156, 159, 168, 167, 169, 170, 163, 168

[56] References Cited
UNITED STATES PATENTS

| 2,951,957 | 9/1960 | Eigeman ..................... | 310/172 |
| 2,981,855 | 4/1961 | Van Lieshout .............. | 310/156 |
| 3,014,141 | 12/1961 | Riggs ........................... | 310/156 |
| 3,119,941 | 1/1964 | Guiot ........................... | 310/156 |
| 3,268,751 | 8/1966 | Nebiolo ........................ | 310/156 |

*Primary Examiner*—Milton O. Hirshfield
*Assistant Examiner*—R. Skudy
*Attorney*—Harness, Dickey & Pierce ABSTRACT: A flux reversing sensor using a single annular permanent magnet having a north and south pole and a pair of members, one of the members having a portion engaged with the north pole of the magnet and the other having a portion engaged with the south pole of the magnet, the members having fingers alternatively arranged such that the fingers of the one member has a north polarity and the fingers of the other member have a south polarity so as to establish an alternating flux field circumferentially along the magnet, the magnet is adapted to rotate relative to a stator with a coil so as to induce an alternating potential in the coil representative of the rotational speed of the magnet.

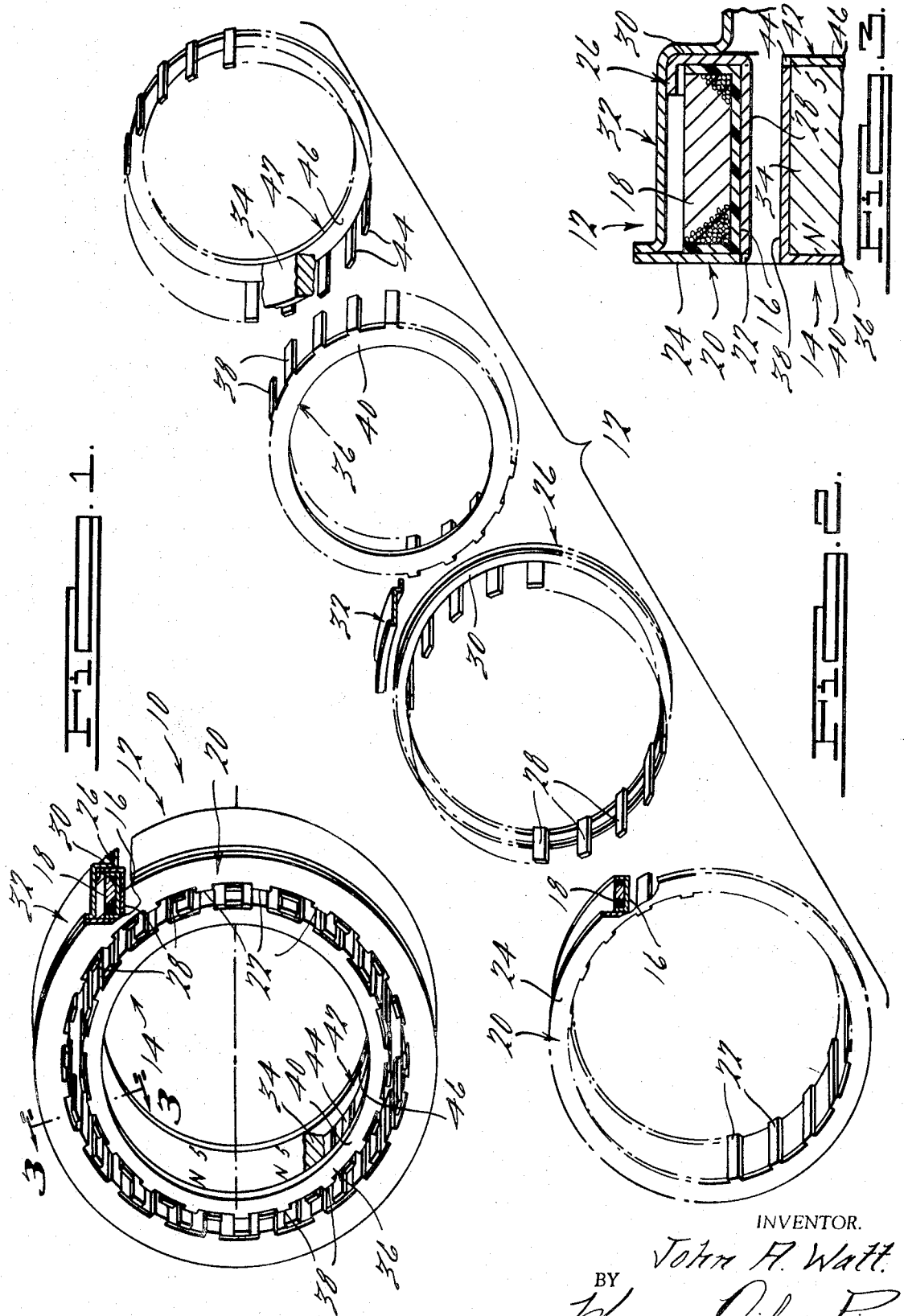

FLUX REVERSING SENSOR

BACKGROUND OF THE INVENTION

The present invention relates to electrical generating devices and more particularly to electrical sensing devices.

In prior electrical sensors providing flux reversal and hence an alternating potential output a plurality of magnets are used and arranged such that alternate magnets are of opposite polarity. In the present invention a single magnet is used and a plurality of opposite polarity poles is provided by a pair of members each having fingers arranged such that the fingers of one of the members have one polarity and the fingers of the other member have the opposite polarity. With this construction a simplified and less expensive assembly can be provided. Therefore it is an object of the present invention to provide a new and improved electrical generating device. It is another object to provide such a device having a new and improved magnet structure defining a plurality of alternate opposite magnet poles using a single magnet having a single north and a single south pole.

Other objects, features, and advantages of the present invention will become apparent from the subsequent description and the appended claims, taken in conjunction with the accompanying drawings, in which:

FIG. 1 is a pictorial view of an electrical sensor embodying features of the present invention;

FIG. 2 is an exploded view of the magnet rotor construction of FIG. 1, and;

FIG. 3 is an enlarged section view taken generally along the line 3-3 in FIG. 1.

Looking now to FIGS. 1 and 2, an electrical sensor 10 is shown and includes a stator 12 and a rotor 14. The stator 12 comprises an annular bobbin 16 having a channel in which a coil 18 is circumferentially wound. A first L-shaped annular shell 20 receives the bobbin 16 and has a plurality of fingers 22 extending axially from a side ring 24. A second L-shaped annular shell 26 also receives the bobbin 16 and has a plurality of fingers 28 extending from a side ring 30. The fingers 22 and 28 are circumferentially distributed and are located alternately relatively to each other. The side rings 24 and 30 are connected together by an outer annular shell 32.

The rotor 14 comprises an annular magnet 34 having oppositely, axially facing north and south poles. A first L-shaped rotor shell 36 receives the magnet 34 and has a plurality of fingers 38 extending axially from a side ring 40. The side ring 40 engages the north pole of magnet 34 and hence each of the fingers 38 define magnetically north poles. A second L-shaped rotor shell 42 receives the magnet 34 and has a plurality of fingers 44 extending axially from a side ring 46. The side ring 46 engages the south pole of magnet 34 and hence each of the fingers 44 define magnetically south poles. The fingers 38 and 44 are located alternately relatively to each other and are spaced whereby circumferentially the rotor 14 has a plurality of alternate north and south poles.

The rotor fingers 38 and 44 are arranged to line up with stator fingers 22 and 28 such that when fingers 38 and fingers 22 are radially aligned, fingers 44 and 28 are radially aligned to define a magnetic path in one direction around the coil 18; upon rotation of rotor 14 fingers 38 and 28 and fingers 44 and 22 are radially aligned to define a magnetic path in the opposite direction around the coil 18. This reversal of the flux around coil 18 results in an alternating potential being induced in coil 18.

With the construction shown and described a relatively inexpensive structure can be used to obtain an alternating potential output.

While it will be apparent that the preferred embodiments of the invention disclosed are well calculated to fulfill the objects above stated, it will be appreciated that the invention is susceptible to modification, variation and change without departing from the proper scope or fair meaning of the invention.

I claim:

1. A rotational speed sensing device comprising: a rotor and a stator, said rotor being rotatably mounted with respect to said stator and including an assembly of a magnet having a north and south pole, a first member having a first plurality of fingers magnetically connected to one pole, a second member having a second plurality of fingers magnetically connected to the other pole, the fingers of said first plurality being located alternately relative to the fingers of said second plurality, said stator including a coil such that rotation of said rotor relative to said stator generates an alternating potential in said coil.

2. The device of claim 1 with said magnet, and said first and second members extending circumferentially.

3. The device of claim 1 with said magnet and said first and second members extending annularly.

4. The device of claim 1 with said stator including shell means having a plurality of fingers with alternate ones defining opposite magnetic paths around said coil, said fingers of said shell means and said fingers of said first and second members being radially aligned whereby relative rotation between said rotor and stator results in flux reversals about said coil and an alternating potential induced in said coil.

5. A rotational speed sensing device comprising: a rotor and a stator, said rotor being rotatably mounted with respect to said stator and including an assembly of an annular magnet having oppositely, axially facing north and south poles, a first L-shaped member having a first radially extending side portion engaging one pole and a first plurality of circumferentially distributed axially extending fingers, a second L-shaped member having a second radially extending side portion engaging the other pole and a second plurality of circumferentially distributed axially extending fingers, the fingers of said first plurality being located alternately relative to the fingers of said second plurality, said stator including a coil and shell means having a plurality of fingers with alternate ones defining opposite magnetic paths around said coil, said fingers of said shell means and said fingers of said first and second members being radially aligned whereby relative rotation between said rotor and stator results in flux reversals about said coil and an alternating potential induced in said coil.